Patented Aug. 13, 1935

2,011,257

UNITED STATES PATENT OFFICE 2,011,257

METHOD OF CRYSTALLIZING AND PURIFYING CRUDE 4.4'-DI-(1-PHENYL-3-METHYL-PYRAZOLONYL)

Iwan I. Ostromislensky, New York, N. Y., assignor to Medico Chemical Corporation of America, New York, N. Y.

No Drawing. Application July 5, 1934, Serial No. 733,871

7 Claims. (Cl. 260—45)

My invention relates to the methods of crystallizing and purifying crude 4,4'-di-(1-phenyl-3-methyl-pyrazolonyl), hereinafter for convenience called dipyrazolonyl.

This is a continuation in part of my application Serial No. 717,723, filed Mar. 28, 1934.

I have found that dipyrazolonyl, when administered in sufficient doses, considerably alleviates symptoms of the anaphylactic shock in animals and thus prevents their otherwise inevitable death. Further investigations have also shown that, in accordance with my theory, this substance considerably relieves withdrawal symptoms in morphine addicts, and checks entirely and reliably the most severe of these symptoms. Likewise in accordance with my theory, dipyrazolonyl has been found to be a very valuable analgesic, for instance, in neuritis, lumbago, headache, toothache, etc., and, in addition, a specific for a number of allergic diseases, in particular arthritis, asthma, hay fever, and migraine. Clinical study of dipyrazolonyl in various hospitals in the United States has shown, however, that the therapeutic dose of this preparation must range around 0.05 gram per pound of the patient's weight, and that in cases of withdrawal of morphine from morphine addicts, and in the treatment of hay fever, allergic arthritis, etc., dipyrazolonyl must be administered in such doses over a period of from four to eight days. It is clear therefore that it is important in all these cases to use only the chemically pure preparation which is of relatively low toxicity as experimentation has shown.

The chemically pure substance of low toxicity will be hereinafter called "Rossium".

The production of pyrazolonyl in chemically pure state is a very difficult problem. The so-called bis-1-phenyl-3-methyl-5-pyrazolone, described by Knorr in 1883 but never used as a specific therapeutic preparation, represents a complex mixture of various compounds, and possesses relatively high toxicity. On being subcutaneously injected, it is tolerated by rabbits and guinea pigs only in doses of 0.3 gr. per kilogram of their weight; 0.4 gram of the preparation cause the death of the animals, usually from one to four hours after the injection.

As I explained in the above indicated patent application, ordinary heretofore known methods of preparation of pyrazolonyl lead to the formation of various admixtures which render the product comparatively highly toxic and unsuitable for therapeutic purposes. The latter cannot be fully removed from the raw product of the reaction—dipyrazolonyl—by any usual methods of purification, and, in particular, by the action of boiling alcohol, acetone, ether, etc. Similarly, repeated precipitation of alkaline solutions of the substance, i. e. aqueous solutions of its sodium salts, by means of acids, for instance, hydrochloric acid, does not lead to the desired results.

Up to the present time no solvent of dipyrazolonyl from which this substance could be recrystallized and thus purified, has been known. I have succeeded, however, in finding such a solvent. I have found that pyrazolonyl easily dissolves in boiling formic acid. The temperature coefficient of its solubility is very low, however: at boiling temperature 100 cc. of formic acid dissolve about 46 grams of dipyrazolonyl.

After being kept for 30 hours in a closed vessel in an ice box, this saturated solution precipitates only about 10 grams of chemically pure crystalline substance, about 36 grams of this substance remaining in solution.

I established, however, that this substance is easy to obtain in chemically pure state by means of recrystallization from various mixtures of formic acid and other carboxylic acids, for instance, from a mixture of formic and acetic acids.

I have found that boiling acetic acid by itself dissolves relatively insignificant amounts of dipyrazolonyl: an approximately 1% solution, saturated at boiling temperature, of the substance in glacial acetic acid, precipitates only about 0.65 gram of the pure product, after being kept in an ice box for 24 hours. Even less successful is the recrystallization of dipyrazolonyl from lower homologues of acetic acid, in spite of their higher boiling points. Thus, in particular, valeric acid dissolves only traces of dipyrazolonyl. If, however, a hot solution of this substance in formic acid is mixed with hot glacial acetic acid, no direct precipitation of the substance is observed. Under these conditions rossium crystallized slowly, being produced in chemically pure state in the form of snow-white, lustrous crystals. The mixture is left standing for several hours, for instance, in an ice box. The crystals are sucked off, washed with glacial acetic acid to remove the mother liquor, and dried at a temperature above the normal to a constant weight. Chemically pure rossium is thus obtained.

*Example.*—45 grams of the raw substance obtained by Knorr's method are dissolved, with a reflux condenser, in 100 cc. of boiling formic acid, and the resultant solution is mixed, after a filtration if necessary, with 300 cc. of glacial acetic acid which has been heated to 100° C. The mixture is cooled in an ice box (or at the room temperature) for several hours. The snow-white highly lustrous crystals which are deposited are sucked off, washed and dried as described above. The yield of the chemically pure substance reaches 30–33 grams, i. e., from 67% to 73% of the original raw product.

Note: The mother liquor remaining after filtration may be precipitated by excess of water, alcohol, ether, acetone etc. The raw pyrazolonyl which is deposited may be again subjected to crystallization from a mixture of formic and acetic acids once or repeatedly for the purpose of purification.

The precipitation of the chemically pure dipyrazolonyl from its saturated hot solution in formic acid may be effected not only by the glacial acetic acid, but also by methyl or ethyl alcohol, preferably heated. For this purpose to the solution of Rossium in formic acid, preferably heated, are added from 3 to 5 volumes of hot methyl alcohol. Dipyrazolonyl is then precipitated in chemically pure, crystalline state. After 20–40 minutes it is sucked off and washed on the funnel with anhydrous methyl alcohol.

It is understood, of course, that the purification of the crude di-phenyl-methyl-pyrazolonyl by its crystallization from formic acid can be used with equal success regardless of the method by which this substance has been originally produced.

In contradistinction to the preparation obtained by Knoor's method, Rossium is almost one half as toxic, and is more resistant to the action of light. Thus, in the open air under prolonged action of sunlight or on being dried at 100° C., it does not lose its snow-white color. The preparation obtained by Knorr's method darkens quickly on the surface when pressed on Buechner's funnels or being dried. This dark color assumes with time a clearly bluish tint. As I have found, it belongs to pyrazolone blue which forms on the surface of the substance under the influence of light and air. Apparently certain admixtures in dipyrazolonyl obtained by Knorr's method accelerate the formation of pyrazolone blue.

I claim as my invention:

1. A method of crystallization and purification of 4,4'-di-(1-phenyl-3-methyl-pyrazolonyl), consisting in dissolving said substance in formic acid, adding a carboxylic acid of aliphatic series, and separating the settling snow-white crystals of the pure product.

2. A method of crystallization and purification of 4,4'-di-(1-phenyl-3-methyl-pyrazolonyl), consisting in dissolving said substance in formic acid, adding acetic acid, and separating the settling snow-white crystals of the pure product.

3. A method of crystallization and purification of 4,4'-di-(1-phenyl-3-methyl-pyrazolonyl), consisting in mixing a solution of said substance in formic acid with several volumes of a carboxylic acid of aliphatic series, and separating the settling snow-white crystals of the pure product.

4. A method of crystallization and purification of 4,4'-di-(1-phenyl-3-methyl-pyrazolonyl), consisting in mixing a solution of said substance in hot formic acid with several volumes of a carboxylic acid of aliphatic series, and separating the settling snow-white crystals of the pure product.

5. A method of crystallization and purification of 4,4'-di-(1-phenyl-3-methyl-pyrazolonyl), consisting in mixing a solution of said substance in hot formic acid with three volumes of a hot carboxylic acid of aliphatic series, and separating the settling snow-white crystals of the pure product.

6. A method of crystallization and purification of 4,4'-di-(1-phenyl-3-methyl-pyrazolonyl), consisting in mixing a solution of said substance in hot formic acid with three volumes of hot acetic acid, and separating the settling snow-white crystals of the pure product.

7. A method of crystallization and purification of 4,4'-di-(1-phenyl-3-methyl-pyrazolonyl), consisting in dissolving said substance in formic acid, adding an inert organic solvent for formic acid, and separating the settling snow-white crystals of the pure product.

IWAN I. OSTROMISLENSKY.